United States Patent
Corghi (10) Patent No.: US 9,662,946 B2
(45) Date of Patent: May 30, 2017

(54) TYRE CHANGING APPARATUS AND METHOD FOR REMOVING A TYRE FROM A CORRESPONDING WHEEL RIM

(75) Inventor: Giulio Corghi, Correggio (IT)

(73) Assignee: CORGHI S.P.A., Correggio (IT)

( * ) Notice: Subject to any disclaimer, the term of this patent is extended or adjusted under 35 U.S.C. 154(b) by 1124 days.

(21) Appl. No.: 13/365,688

(22) Filed: Feb. 3, 2012

(65) Prior Publication Data

US 2012/0199293 A1    Aug. 9, 2012

(30) Foreign Application Priority Data

Feb. 8, 2011  (IT) .............................. BO2011A0054

(51) Int. Cl.
*B60C 25/138* (2006.01)
*B23P 17/00* (2006.01)
*B60C 25/05* (2006.01)

(52) U.S. Cl.
CPC .......... *B60C 25/138* (2013.01); *B60C 25/056* (2013.04); *B60C 25/0593* (2013.04); *Y10T 29/49494* (2015.01)

(58) Field of Classification Search
CPC . B60C 25/056; B60C 25/0593; B60C 25/138; Y10T 29/49494
USPC ....................................................... 157/1.24
See application file for complete search history.

(56) References Cited

U.S. PATENT DOCUMENTS

| 8,276,641 | B2 * | 10/2012 | Matteucci ............. B60C 25/138 |
| | | | 157/1.24 |
| 8,342,223 | B2 * | 1/2013 | Sotgiu .................... B60C 25/135 |
| | | | 157/1.24 |
| 8,387,675 | B1 * | 3/2013 | Vaninger et al. ............ 157/1.24 |
| 8,613,303 | B1 * | 12/2013 | Hanneken et al. .......... 157/1.17 |
| 8,770,254 | B1 * | 7/2014 | Hanneken et al. .......... 157/1.17 |
| 8,783,326 | B1 * | 7/2014 | Vaninger ............. B60C 25/0551 |
| | | | 157/1.17 |
| 2001/0042601 | A1 | 11/2001 | Corghi |
| 2002/0017368 | A1 | 2/2002 | Corghi |
| 2009/0266494 | A1 | 10/2009 | Sotgiu |

FOREIGN PATENT DOCUMENTS

| EP | 1 157 860 A2 | 11/2001 |
| EP | 1 177 920 A2 | 2/2002 |
| EP | 2 110 270 A1 | 10/2009 |

* cited by examiner

*Primary Examiner* — Hadi Shakeri
(74) *Attorney, Agent, or Firm* — Pearne & Gordon LLP (57) ABSTRACT

A tire changing apparatus for removing a tire from a corresponding rim of a wheel, comprising a frame having a supporting element configured to support the wheel rotatably about an axis of rotation, a bead breaker tool associated with the frame and movable towards and away from the supporting element along a movement direction, an actuator connected to the tool in order to move the latter along the movement direction and control means connected to the actuator. The control means comprise a processor which is set up to receive data representing a curve of the feed speed of the bead breaker tool towards the supporting element and which is programmed to identify a position of contact of the tool with the tire as a function of a deceleration of the bead breaker tool.

17 Claims, 5 Drawing Sheets

TYRE CHANGING APPARATUS AND METHOD FOR REMOVING A TYRE FROM A CORRESPONDING WHEEL RIM

BACKGROUND OF THE INVENTION

This invention relates to a tyre changing apparatus and method for removing a tyre from a corresponding wheel rim.

The invention applies generally to the automotive technical field and, more specifically, to the sector of vehicle service equipment.

SUMMARY OF THE INVENTION

Known in the prior art is tyre changing equipment of many different kinds, equipped basically with a rotatable supporting element, commonly known as turntable, to which the wheel rim is anchored, and a turret from which extend one or more arms, each equipped with a specific tool used during tyre removal.

This invention addresses in particular the bead breaker tool, that is to say, the tool used by the operator to release and separate the tyre bead from the edge of the wheel rim in order to facilitate removal.

For separating the bead, the bead breaker tool is placed between the bead and the rim.

It should be noted that the term "bead" denotes the portion of the tyre running round the inner edge of the tyre.

The distinctive feature of this edge portion is that it has a thick lip, where a metal ring is generally embedded, allowing it to seal to the edge of the rim.

The bead breaker tool is movable towards and away from the turntable along a direction substantially parallel to the axis of rotation of the wheel on the turntable.

As a result, the bead breaker tool is typically movable relative to the turntable between a first position, distal from the wheel, and a second position, where it engages the tyre to enable the bead to be separated.

In detail, the movement is divided into two steps, one for positioning and one for working.

In the positioning step, the tool is close to or in contact with the flank of the tyre.

In the working step, the tool is inserted between the tyre and the rim.

More in detail, the working step is preferably divided into two sub-steps. In the first sub-step, the bead breaker tool is brought into contact with the tyre and applies a strong pressure to the flank of the tyre in order to separate the bead from the edge of the rim.

In the second sub-step, the bead breaker tool 9 penetrates the rim and becomes lodged between the edge and the bead so that the bead can be separated when the tyre is rotated.

In most prior art applications, this movement is controlled by the operator, both manually and through a remote control.

Alternatively, in a prior art solution, the bead breaker tool is placed in the contact position automatically, without the direct intervention of the operator.

A solution of this kind is known from patent EP1157860 to the same Applicant as this invention.

That document describes a tyre changing apparatus comprising a turntable mounted on a rotary shaft and frame parallel to the axis of rotation of the turntable on which slides the arm for connecting a bead breaker device.

More specifically, in that solution, the bead breaker device is connected to the frame by an arm at right angles to the frame itself and is articulated to it in such a way that it can vary its angular position relative to the arm itself when it comes into contact with the flank of the tyre.

In other words, between the arm and the tool there is an articulated "wrist" which allows relative inclination.

At the articulation there is a microswitch designed to detect when the angular position of the tool relative to the arm exceeds (or falls below) a predetermined value as a result of contact between the bead breaker tool and the tyre flank.

Consequently, that solution comprises a snap sensor located near the bead breaker tool.

According to the solution described in that patent, when such a variation is detected, a lockable portion of the arm associated with the frame is locked.

At the same time, thanks to the presence of a cam mechanism, the tool is moved relative to the lockable position along a substantially radial direction until it is inserted between the tyre and the rim.

A similar solution is known from document EP2110270A1, which describes a tyre changing apparatus provided with a system for automatically positioning the bead breaker tool, according to the solution mentioned above.

Disadvantageously, that solution requires the sensor to be positioned near the bead breaker tool, that is to say, in a zone which is particularly dirty and subject to stresses, both mechanical and thermal.

In effect, the bead breaker tool operates between the tyre and the edge of the rim, a zone where rubber residues, brake dust and dirt from the road build up as the vehicle travels.

Further, the presence of an articulation greatly complicates the structure of the apparatus.

In effect, the further degree of freedom means introducing further components, that is to say, further points of possible structural weakening and failure.

Moreover, it should be noted that the presence of the articulation entails the presence of locking means which, once in use, allow the bead breaker tool to operate correctly.

It is known from EP1177920A2 a tyre changer apparatus having a frame, a bead-breaker tool and a demounting tool, similar to those of the apparatus of the invention; however, said apparatus is not provided with any system for controlling the position of the tools.

In light of this, the technical purpose of this invention is to provide an apparatus for removing a tyre from a corresponding wheel rim and which overcomes the above mentioned disadvantages of the prior art.

In particular, it is an aim of this invention to provide an apparatus for removing a tyre from a corresponding wheel rim and which is reliable and easy to construct.

It is also an aim of this invention to provide a tyre changing method for removing a tyre from a corresponding wheel rim and which is particularly intuitive and applicable to many different types of tyre removal apparatuses.

These aims are fully achieved by the tyre changing apparatus according to the invention for removing a tyre from a corresponding wheel rim, as characterized in the appended claims and, more specifically, characterized by control means comprising a processor which is set up to receive input data representing (i.e. data from which it can be derived) a curve (i.e. a trend, a development) of the feed speed of the bead breaker tool towards the supporting element and which is programmed to identify a position of contact of the bead breaker tool with the tyre as a function of (i.e. in response to, with reference to) a deceleration of the bead breaker tool.

BRIEF DESCRIPTION OF THE DRAWINGS

Further characteristics and advantages of the invention are more apparent in the non-limiting description which follows of a preferred but non-exclusive embodiment of a tyre changing apparatus for removing tyres from a corresponding rim of a wheels, as illustrated in the accompanying drawings, in which.

DESCRIPTION OF THE PREFERRED EMBODIMENTS

With reference to the accompanying drawings, the numeral 1 denotes a tyre changing apparatus according to this invention for removing a tyre 3 from a corresponding rim 4 of a wheel 2.

The apparatus 1 comprises a base frame 5 having a wheel 2 supporting element 6 rotatable about an axis of rotation "A".

The supporting element 6 is substantially defined by a central body 6a equipped with at least one clamping member configured to engage the rim 4 and hold the wheel 2 in place during removal of the tyre.

The supporting element 6 thus defines a zone 7 for supporting and receiving the wheel 2.

By zone 7 for supporting and receiving is meant, preferably, a space occupied by the wheel 2 when it is fixed to the support 6.

In the embodiment illustrated, the supporting element 6 (also called "turntable") comprises a shaft (not illustrated) rotatable about an axis of rotation "A" (vertical in the example illustrated) and a plate fixed to the shaft for rotating about the axis and supporting the wheel 2.

The wheel 2 is positioned on the plate and clamped to it by a clamping device (not illustrated, of known type), so as to rotate as one with the shaft.

It should be noted, however, that the supporting element 6 might support the wheel 2 on a horizontal or oblique shaft (in that case the wheel is rotated about a corresponding horizontal or oblique axis defined by the supporting element 6), without thereby departing from the spirit of the invention.

The frame 5 also comprises a turret 10 extending substantially parallel to the axis of extension of the supporting element 6.

In the embodiment illustrated, the turret 10 extends vertically.

Alternatively, and in the same way as the supporting element, the turret might extend on a horizontal or oblique axis, without thereby departing from the spirit of the invention.

Connected to the turret 10 there is at least one bead breaker tool 9 adapted to be inserted between a bead 3a of the tyre 3 and an edge 4a of the rim 4.

Also extending from the turret 10 is a plurality of further tools 22, used one after the other or in conjunction for fitting and removing the tyre 3 to and from the rim 4.

The bead breaker tool 9 is movable relative to the supporting element 6 to pass from a rest position (of non-interference with the wheel, at a predetermined distance from the latter, necessary to allow the user to work without hindrance) to a working position.

Preferably, the movement of the bead breaker tool from the rest position to the working position is divided into three steps: a centring step (where the position of the bead breaker tool 9 relative to the supporting element 6 is adjusted for example by moving the supporting element 6 along a direction perpendicular to the axis of rotation of the supporting element 6 itself), a positioning step (where the bead breaker tool 9 is moved along a direction parallel to the axis of rotation of the supporting element 6) and a working step (which occurs during rotation of the wheel and where the bead breaker tool 9 is moved in such a way that the bead can actually be separated, as described below).

In order to perform the centring step, the supporting element 6 is movable towards and away from the tool 9 along a centring direction "D" substantially transversal (that is, perpendicular) to the axis of rotation of the supporting element 6; at the same time, the bead breaker tool 9 is made to rotate about the axis "B", substantially parallel to the axis of rotation "A" of the supporting element 6, in such a way that for each diameter of the rim 4, the connecting arm of the tool 9 is oriented towards the axis of rotation "A".

The purpose of the centring step is to locate the tool 9 correctly relative to the rim 4 of the wheel 2.

Preferably, the locating movement is performed automatically by setting the position of the rim 4 or detecting it using sensor means.

Hence, the centring direction "D" is a direction which is radial to the wheel 2, and thus to the turntable 8.

In other words, the tool 9 and the axis of the wheel 2 are made to perform a movement towards and away from each other (this movement comprises, for example, a movement of the supporting element 6 and, preferably, of a supporting arm 11 for the bead breaker tool 9, combined with the movement of the supporting element 6).

In embodiments where the turntable remains stationary, it is the tool 9 that is made to move towards and away from the turret 10 in order to move towards and away from the centre of the wheel 2.

Preferably, when the centring step has been completed, the tool 9 faces the edge of the tyre 3, above or below the latter.

Thus, when the centring step has been completed, the bead breaker tool 9 is located at a position external to the rim 4.

The bead breaker tool 9 is also movable towards and away from the supporting element 6 along a movement direction "B" in order to perform the positioning step.

In other words, the tool 9 is movable along the turret 10 to move towards and away from the tyre 3 coaxially with the latter.

This movement is performed preferably after centring so as to place the bead breaker tool 9 and the tyre 3 in contact with each other.

More precisely, in that contact position, the bead breaker tool 9 is positioned on the flank of the tyre 3, but radially slightly offset from the bead 3a and hence from the rim 4 (for example by 1-5 mm, since the bead breaker tool must work as close as possible to the tyre bead but without touching the rim and while operating on the flank).

In effect, the positioning step is performed by moving the tool 9 along the movement direction "B", and consequently, the distance between the bead breaker tool 9 and the axis of the rim 4 remains the same as the one set during the centring step.

The bead breaker tool 9 is thus movable along the movement direction "B" between a first position, distal from the supporting element 6 and a second position, proximal to the supporting element 6.

In the embodiment illustrated, the bead breaker tool 9, at the first position, is above the turntable 6 and, during movement, is lowered until it touches the tyre 3.

Thus, the first position is a raised position and the second position is a lowered position.

It should be noted that at the second position the bead breaker tool 9 is inside the supporting and receiving zone 7.

In effect, in use, the bead breaker tool 9 is in contact with, and partly deforms, the tyre 3 and consequently is located inside the zone 7 for supporting and receiving the wheel 2.

After the positioning step, during the working step, the tool 9 is moved to a working position.

More precisely, the bead breaker tool 9 is moved towards the bead 3a and moved from the contact position to the working position.

More in detail, the working step is preferably divided into two sub-steps. In the first sub-step, the bead breaker tool 9 is brought into contact with the tyre 3 and applies a strong pressure to the flank of the tyre 3 in order to separate the bead 3a from the edge 4a of the rim 4.

In the second sub-step, the bead breaker tool 9 penetrates between the edge 4a of the rim 4 and the bead 3a of the tyre 3 so that the bead can be separated when the tyre 3 is made to rotate by the supporting element 6.

In other words, in the second sub-step, the bead breaker tool 9 is inserted (placed) between the tyre 3 and the rim 4 in order to separate the latter from the bead.

In the embodiment illustrated, the tyre changing apparatus 1 comprises two bead breaker tools 9, 90 located in the proximity of two opposite flanks of the tyre 3 to operate on opposite beads 3a, 3b of the tyre 3.

In effect, it should be noted that each tyre comprises a first bead 3a and a second bead 3b, opposite each other and each substantially annular in shape and designed to be associated with a respective edge 4a, 4b of the rim 4.

In light of this, the tyre changing apparatus 1 illustrated comprises an upper bead breaker tool 9 and a lower bead breaker tool 90.

Obviously, as if it were a reflection of the upper bead breaker tool 9, the lower bead breaker tool 90 is lowered in the first position and raised in the second position.

The relative terms "upper" and "lower" apply to apparatuses whose turntable rotates about a vertical axis.

In alternative embodiments (not illustrated), the tyre changing apparatus 1 comprises a single bead breaker tool, tiltable by the operator, typically by 180°, to release both the bead that faces the supporting element (in the case of vertical axis, the second bead, or lower bead) and the bead opposite it, in corresponding operating positions.

Preferably, the bead breaker tool 9 is in the form of a roller or disc, to roll on the bead of the tyre 3 during the bead release operation.

In other words, the bead breaker tool 9 preferably comprises a bead breaker disc or roller 9a.

To allow movement of the tool 9 along the direction of movement "B", the tyre changing apparatus 1 comprises at least one actuator 15 associated with the tool 9.

More precisely, the actuator 15 operates between the tool and the frame 5 along the direction of movement "B".

The actuator 15 may be hydraulic, pneumatic or electrical.

In the embodiment illustrated, the actuator 15 comprises a hydraulic piston 16 comprising a cylinder 16a and a rod 16b.

Preferably, the cylinder 16a is associated with the frame 5, while the rod 16b is associated with the tool 9.

Preferably, the actuator 15 is configured to move the bead breaker tool 9 by applying to it a force which is constant or which follows a predetermined curve.

This feature will become clearer as this description continues.

From the turret 10 extends an arm 11 for connection to the bead breaker tool 9.

More specifically, the arm 11 has a first end 11a guided on the turret 10 and connected to the actuator and a second end 11b associated with the bead breaker tool 9.

More precisely, the bead breaker roller (or disc) 9a is pivoted to the second end 11b of the arm 11 to roll on the tyre 3 during bead separation.

In the embodiment illustrated, the bead breaker roller (or disc) 9a rotates about an axis of rotation "C" inclined at an angle to the axis of rotation "A" of the supporting element 6.

In other words, the bead breaker roller 9a is centrally pivoted to the second end 11b of the arm and freely rotatable relative to the latter.

Preferably, the arm 11 extends transversally to the direction of extension of the turret 10.

In the embodiment illustrated, the arm 11 extends transversally to the direction of movement of the bead breaker tool 9.

Further, in an alternative embodiment (not illustrated), the arm is telescopic to allow the bead breaker tool to move also radially towards and/or away from the wheel.

The tyre changing apparatus 1 according to this invention also comprises control means 14 for automatically positioning the bead breaker tool 9. Advantageously, the control means 14 allow the tyre 3 bead separating operation to be simplified and speeded up, making the positioning step rapid and precise.

The control means 14 allow the position of the bead breaker tool 9 relative to the wheel 2 to be identified (by identifying the position of the bead breaker tool when the latter is in contact with the tyre).

In effect, by combining the centring step with the positioning step, it is possible to define the position of the tool 9 relative to the wheel 2.

More specifically, the centring step comprises radially positioning the tool 9 based on the information about the position or size of the rim 4.

Thus, (after the centring step) the distance between the tool and the rim, measured perpendicularly to the axis of rotation "A" of the wheel, is known.

Similarly, after the positioning step, the axial position of the tool 9 relative to the tyre 3 and rim 4 is known.

Consequently, after positioning, it is possible to perform the working step through a sequence of preset movements of the tool 9, independently of the type of wheel 2 and/or tyre 3.

This aspect will be made clearer as this description continues.

The control means 14 comprise a processor 18 which is set up to receive input data representing a curve of the feed speed of the bead breaker tool 9 towards the supporting element 6 along the direction of movement "B" and which is programmed to identify a position of contact of the bead breaker tool 9 with the tyre 3 as a function of a deceleration of the bead breaker tool 9.

Preferably, the control means 14 comprise an input module 17 configured to receive data representing a curve of the feed speed of the bead breaker tool 9 towards the supporting element along the direction of movement "B".

In other words, the control means 14 acquire data correlated with the speed of the bead breaker tool 9 in order to derive from that data a curve or a variation between successive instants.

By "correlated with" or "representing" is meant that the data can be used to derive, directly or through mathematical processes, the speed curve of the bead breaker tool 9 between at least two successive points.

In light of this, the input module 17 is configured to receive data relating, for example, to the position of the tool and/or the speed of the tool 9 and/or the acceleration of the tool 9 and/or the current absorbed by the actuator (if electrical) and/or the pressure inside the actuator 15 (if hydraulic or pneumatic) and/or the supply flow rate of the actuator 15.

In effect, from these quantities, it is possible to find the speed of the tool 9 through mathematical integrations, derivations or transformations.

Advantageously, when the speed curve is known, the processor 18 can estimate (or calculate) when the bead breaker tool 9 is in contact with the tyre 3.

In other words, the processor 18 monitors the speed curve of the bead breaker tool 9 until a predetermined decrease in the speed occurs as a result of interference between the tool 9 and the flank of the tyre 3.

More specifically, the processor 18 is programmed to derive (that is, identify, calculate or estimate) a position of contact of the bead breaker tool 9 with the tyre 3 as a function of a decrease in the speed (that is, a deceleration) of the bead breaker tool 9 itself.

Figure 1:
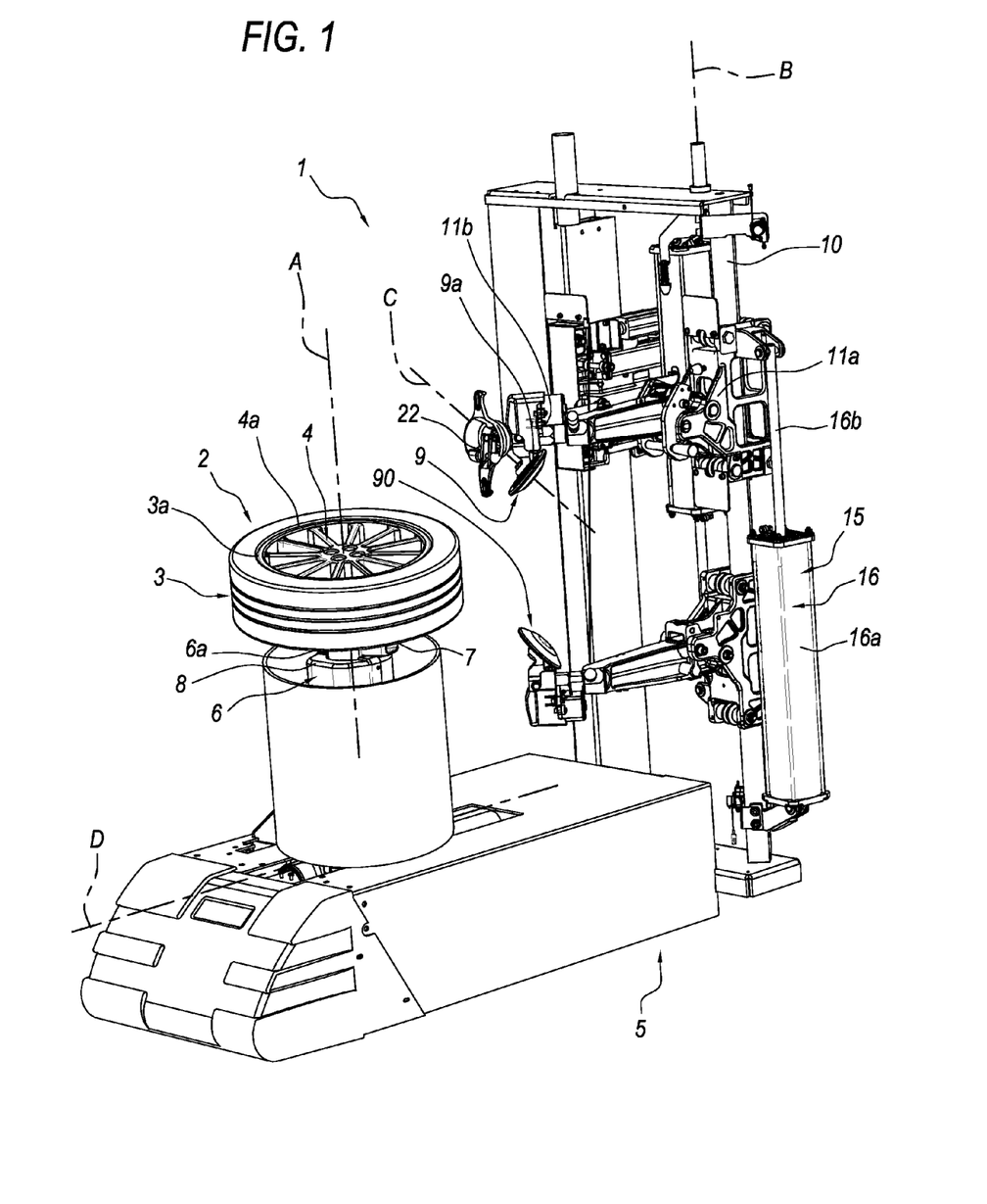
FIG. 1 is a perspective view of a tyre changing apparatus according to this invention for fitting and removing a tyre to and from a corresponding wheel rim.
Figure 2A:
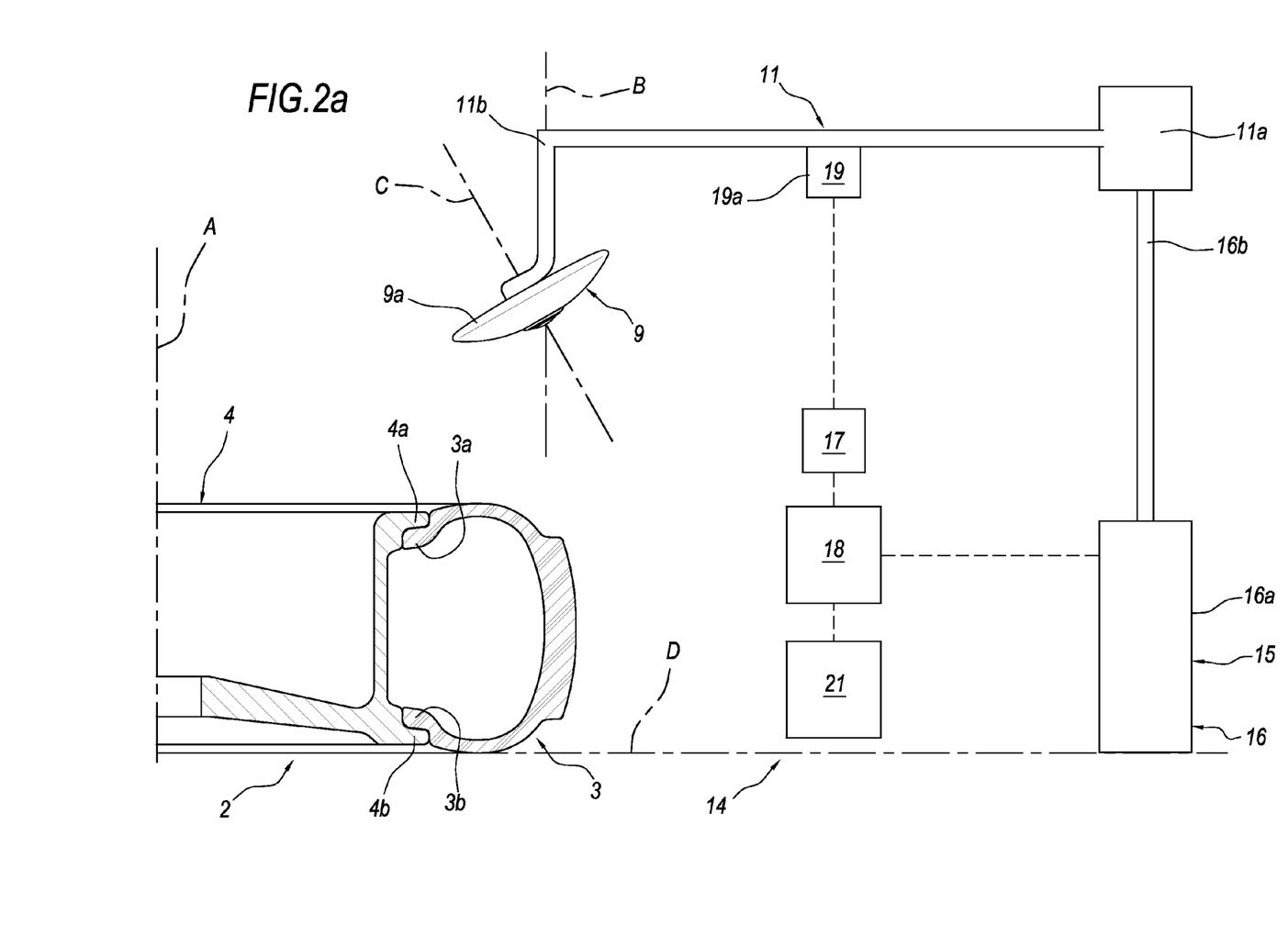
FIGS. 2a and 2b show a succession of operating positions of the apparatus of FIG. 1.
Figure 2B:
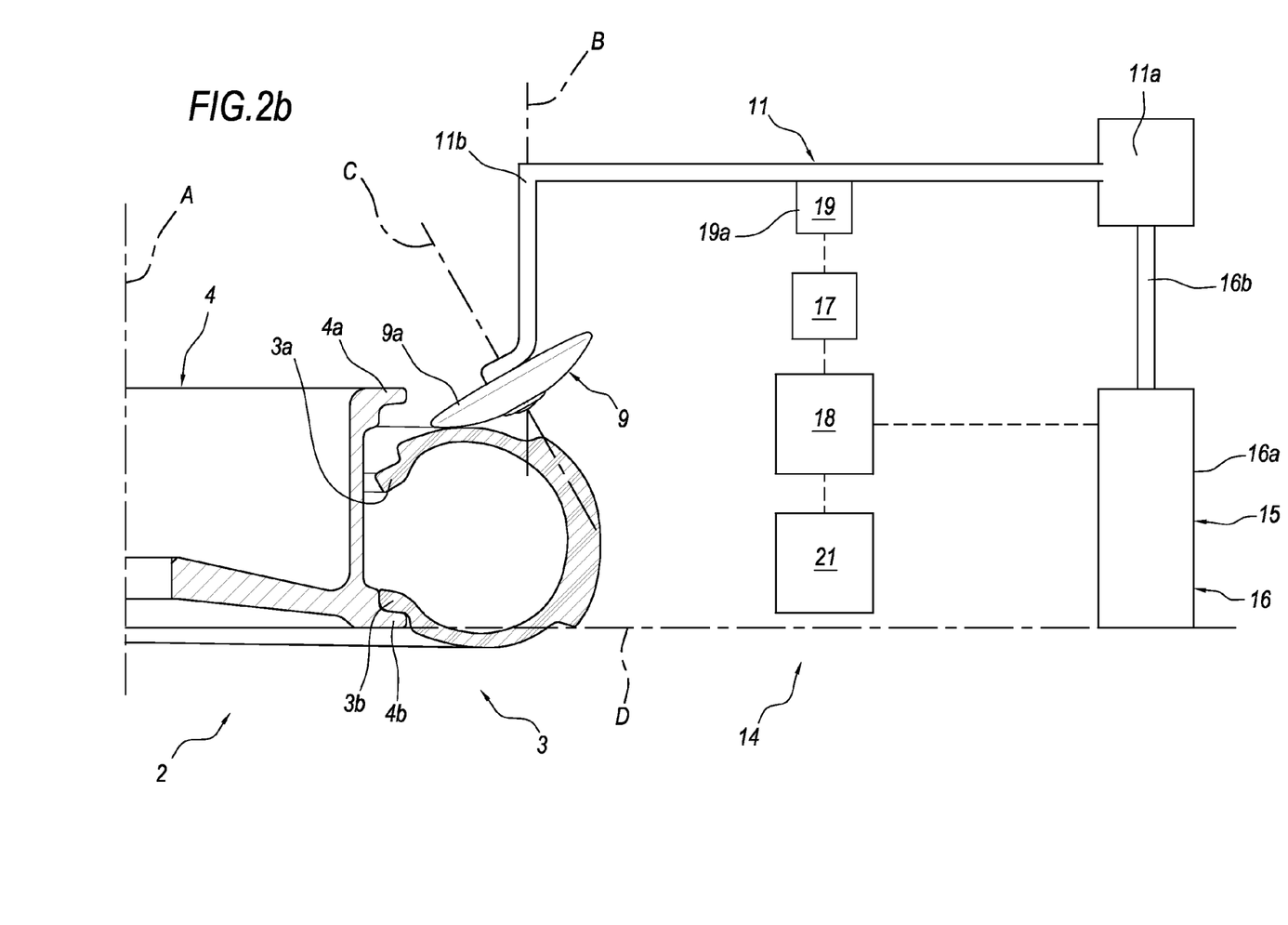
Figure 3:
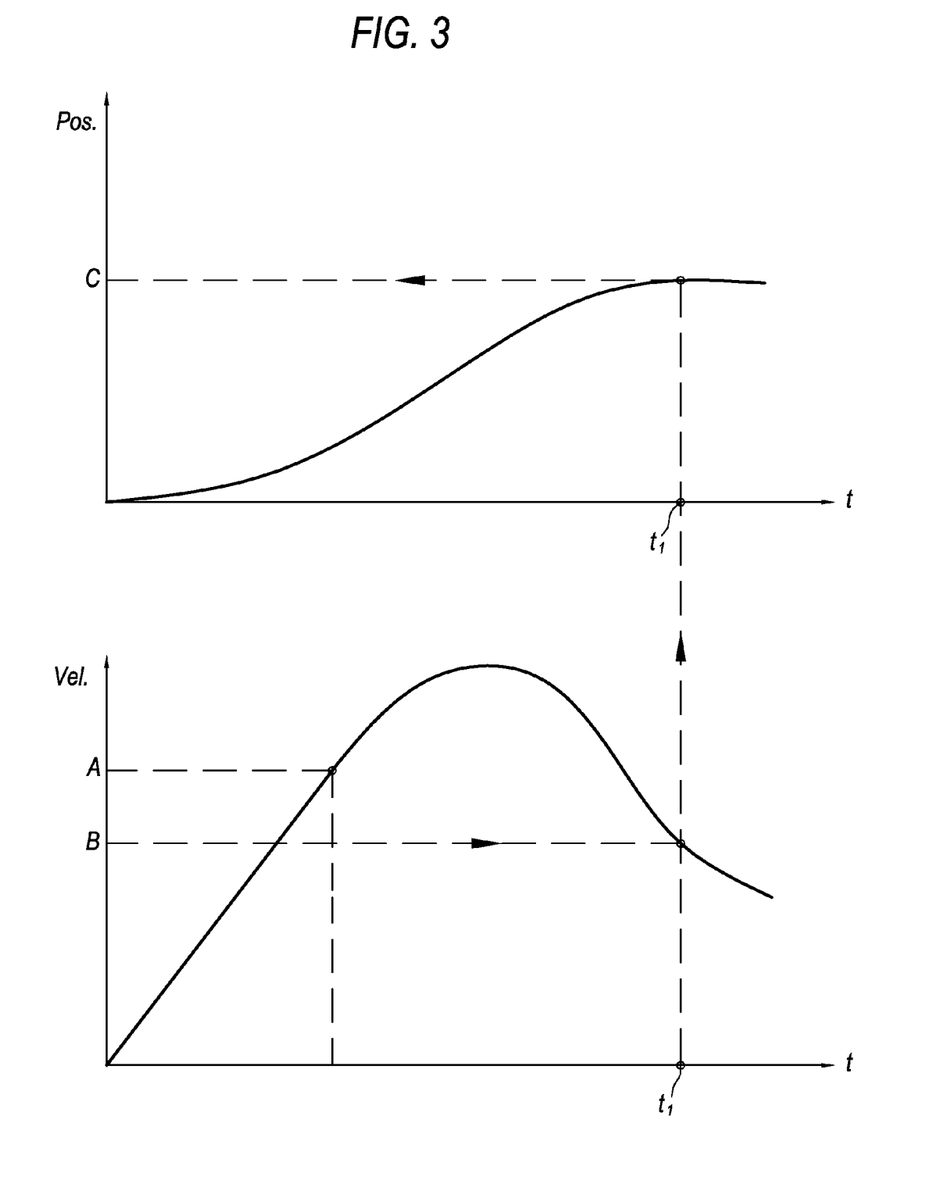
FIG. 3 represents an acquisition of data relating to the position of the tool over time and a corresponding processing of the tool speed curve over time.
Figure 4:
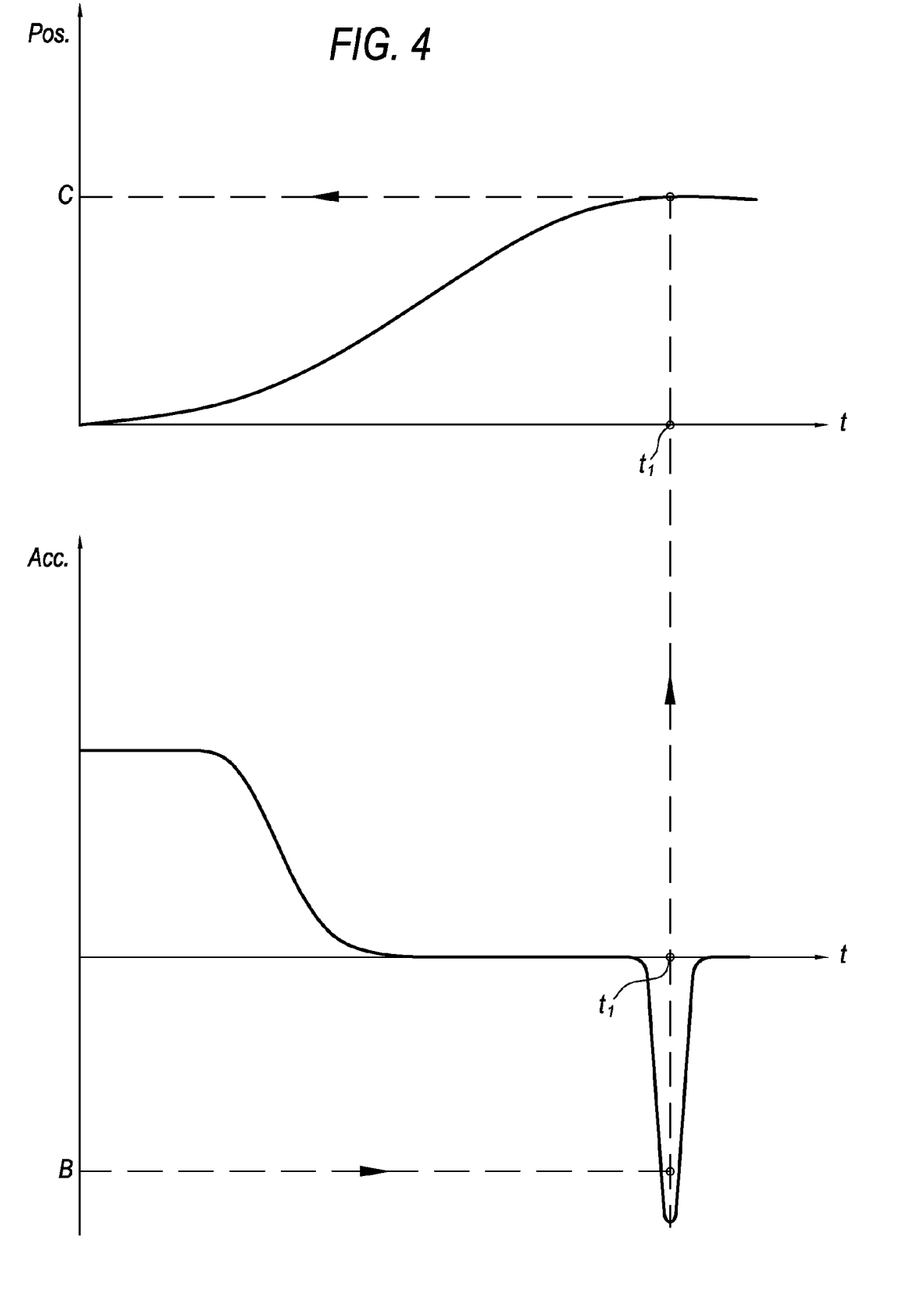
FIG. 4 represents an acquisition of data relating to the position of the tool over time and a corresponding acquisition of data relating to the acceleration of the tool over time.

In effect, after coming into contact with the tyre 3, the tool 9 slows down, more or less suddenly, allowing the processor 18 to derive its contact position (labelled C in FIGS. 3 and 4).

Preferably, the processor 18 is programmed to derive the contact position when the speed decrease (or deceleration) of the tool 9 is not attributable to the force applied by the actuator 15 or to the weight force.

In other words, in a first embodiment, the actuator 15 is configured to move the tool 9 without decelerations (that is, according to a constant or increasing law of motion) comparable to that determined by the contact between the tool 9 and the tyre 3.

It is thus possible to prevent the processor 18 from deriving a position which does not correspond to the contact position but which, on the contrary, is attributable solely to the law of motion applied by the actuator 15.

In other words, false identification of the contact position can thus be avoided.

In a second embodiment, the processor 18 is connected to the actuator 15 so that the latter's law of motion is known.

That way, a deceleration imparted to the tool 9 by the actuator 15 would not be erroneously read by the processor 18 as contact between the tyre 3 and the tool 9.

Preferably, the control means 14 comprise a sensor 19 designed to detect data representing a sequence of speed values of the bead breaker tool 9 in a time series.

In other words, the sensor 19 is configured to make the data representing the speed of the tool 9 available to the input module 17 in a sequence.

In the embodiment illustrated, the sensor 19 comprises a position transducer 19a connected to the tool 9 to detect the latter's position instantaneously. Preferably, the transducer 19a is a potentiometer. More preferably, the potentiometer is a "wire" potentiometer.

Alternatively, the transducer 19a may be an ultrasound remote sensor or an optical sensor. Consequently, the sensor 19 makes available to the input module 17 a sequence of data representing the position of the tool 9 along the direction of movement "B", from which the processor 18 can derive the speed curve.

In this regard, the processor 17 is programmed to measure the values representing tool 9 position at predetermined time intervals, so that the corresponding speed values can be compared.

In other words, the processor 18 is programmed to derive the speed values in each predetermined time interval by correlating with each other successive values of position detected at the ends of that interval.

In light of this, the control means 14 comprise a timer associated with the processor 18 to allow the processor 18 to detect the position of the bead breaker tool 9 at regular intervals.

The timer may be associated directly with the processor 18 or with the input module 17.

That way, the processor 18 receives as input a first signal representing the position and a second signal representing the time and from these it derives the speed.

Alternatively, it is possible to provide the tool with sensors such as a speed and/or acceleration transducer in order to make data corresponding to the speed and/or acceleration of the tool directly available to the processor.

If an acceleration sensor is used, the tool 9 is equipped with an accelerometer, preferably made with MEMS (Micro Electro-Mechanical Systems) technology.

In such an embodiment, the contact position can be derived by integrating the signal representing the speed.

In embodiments without timers, it is possible to compare the first signal representing the position directly with a further signal selected from the ones listed below:
  speed,
  acceleration,
  current (in the case of an electric actuator)
  pressure/force/flow rate (in the case of pneumatic or hydraulic actuator).

In effect, all these parameters are strictly correlated with (and in a broader sense, "represent") the feed speed of the tool 9.

Thus, placing a constraint on tool 9 feed would cause the following variations in the above mentioned quantities:
  decrease of speed,
  change of sign of acceleration,
  increase of absorbed current,
  increase of pressure in the cylinder.

In the embodiment illustrated, the processor 18 is programmed to derive the position of the tool 9 when the speed of the tool 9 falls below a predetermined threshold value (labelled B in FIGS. 3 and 4).

In other words, a speed threshold value representing contact between the tyre 3 and the tool 9 is set by the processor 18 itself or manually by the operator.

When the processor 18 detects a tool 9 speed below that threshold value, it identifies the position of the tool 9 and adopts it as the contact position.

The processor 18 is also programmed to be activated when the speed of the tool 9 exceeds a predetermined activation value (labelled A in FIGS. 3 and 4), above the predetermined threshold value.

That way, a speed decrease below the threshold value is surely attributed to a deceleration which is high enough to be attributed to the constraint applied to the tool 9 by the tyre 3.

Advantageously, that prevents the processor 18 from erroneously deriving the contact position on account of a fluctuation of the signal around the threshold value while the actuator 15 is starting up.

In use, the actuator 15 moves the tool 9 in the direction of the wheel 2 at a predetermined acceleration until the activation speed value is exceeded.

At this point, the control means 14 are activated and the processor 18 monitors the speed curve of the tool 9 until the speed falls below the threshold value. When this event occurs, the processor 18 identifies the position of the tool 9 and adopts it as the contact position.

In light of this, the processor 18 is connected to the actuator 15 to disable it once the contact position has been determined.

The processor 18 is also connected to the actuator 15 to activate it once the contact position has been reached.

In effect, as mentioned above, once the contact position has been determined, the tool 9 automatically moves to a known position relative to the wheel 2. Consequently, by a predetermined sequence of movements, it is possible move it from the contact position to the working position.

Preferably, movement means (not illustrated) move the bead breaker tool 9 to an intermediate position where bead separation starts.

The intermediate position may or may not coincide with the contact position.

Whether these positions coincide or not depends on the type of movement imparted to the tool 9 to move it from the contact position to the working position.

More precisely, depending on the movement necessary for the tool 9 to move to the working position, it is possible to predetermine the intermediate position by applying a preset offset from the contact position.

The movement between the contact position and the working position may be obtained by cam means or by linkages or by any other known method (for example by direct movements of actuators without cams or linkages).

More specifically, in a first embodiment, the actuator 15 and a cam are coupled in such a way that the movement imparted by the actuator 15 along the movement direction "B" also causes a radial movement of the tool 9 to the working position.

In a second embodiment, the cam is associated with means for moving the turret along the positioning direction "B" in such a way that the radial movement imparted by these means is combined with an axial component determined by the cam.

In a third embodiment, the tool is associated with the arm through an articulated linkage which, once actuated, imparts to the tool a combined roto-translational movement which takes it from the contact position to the working position.

In a fourth embodiment, the movement of the bead breaker tool 9 relative to the edge 4a occurs by combining the translation of the tool 9 along the movement direction "B" with the translation of the supporting element 6 in a direction at right angles to the axis of rotation "A".

Preferably, the control means 14 comprise a memory 21 associated with the processor 18 and configured to store the data representing the derived position of the tool 9.

Advantageously, this makes it possible to hold in the memory the contact position for all four wheels of a single vehicle which, presumably, have the same type of tyre and the same type of rim.

Thus, after the processor 18 has derived the contact position on the first tyre, bead separation on the other three tyres can be carried out more quickly.

Preferably, the threshold and activation values correspond to predetermined fractions of a peak value of tool 9 speed.

These values (threshold, activation and peak) are preferably determined during a step of calibrating the control means 14, performed prior to activation of the tyre changing apparatus 1.

The calibrating step is performed before the tyre changing apparatus 1 is used in order to identify, through the sensor 19, the peak value of the speed reached by the tool 9 and to identify, manually or automatically through the processor 18, the threshold and activation values.

Thus, this step entails moving the bead breaker tool 9 along the movement direction "B".

During this movement, or after it, the sensor 19 makes available to the input module 17, or to an operator, the speed curve of the tool 9, which will have a peak value.

As a function of this peak value, the threshold and activation values for positioning control can be set automatically by the processor or manually by an operator.

Preferably, these threshold and activation values are determined according to the following mathematical criteria:

$$V_{threshold} = k1 \cdot V_{peak}$$

$$V_{activation} = k2 \cdot V_{peak}$$

where:
$V_{threshold}$ is the threshold value;
$V_{activation}$ is the activation value;
$V_{peak}$ is the peak value;
k1 is a constant in the interval [0, 1], preferably in the interval [0.1, 0.8], and more preferably in the interval [0.4, 0.6];
k2 is a constant in the interval [0, 1], preferably in the interval [0.2, 0.9], and more preferably in the interval [0.5, 0.8].

This invention also relates to a tyre changing method for removing a tyre 3 from a corresponding rim 4 of a wheel 2.

This method comprises the step of positioning the wheel 2 on the supporting element 6 in such a way that it rotates about its axis of rotation "A".

Next, the method comprises a step of moving the bead breaker tool 9 towards the wheel 2.

Concurrently, data representing the curve of bead breaker tool 9 speed of feed towards the wheel 2 are detected.

According to the invention, the method comprises deriving at least one predetermined reference value of a control parameter correlated with the speed curve and setting that predetermined reference value, so as to allow the control means 14 to identify the contact position as a function of that predetermined reference value.

In other words, the method comprises identifying the position of bead breaker tool 9 contact with the tyre 3 as a function of the speed curve (or as a function of an acceleration curve).

More precisely, the deriving step is performed when the feed speed of the tool 9 decreases to a predetermined value.

Next, during a step of separating the tyre bead, the bead breaker tool 9 is positioned at the previously derived position.

The invention achieves the above mentioned aims and has important advantages.

In effect, the presence of a speed control does not involve any structural modification to the tyre changing apparatus and does not require the sensors to be mounted near the tool.

Advantageously, that makes it possible to obtain a tyre changing apparatus that is simple to construct, robust in structure and very reliable.

Moreover, the possibility of controlling tool locking at the contact position even after that position has been derived make the bead separating operation even more simple and flexible.

Advantageously, also, the possibility of storing this data in the memory allows the bead separating operation to be further speeded up for the next three tyres of the vehicle.

Still more advantageously, it is possible to retrieve previously stored data for subsequent removal of the tyres from the vehicle wheels.

What is claimed is:

1. A tyre changing apparatus for removing a tyre from a corresponding rim of a wheel, comprising:
   a frame having a supporting element configured to support the wheel rotatably about an axis of rotation;
   a bead breaker tool associated with the frame and movable towards and away from the supporting element along a movement direction parallel to the axis of rotation;
   an actuator connected to the bead breaker tool in order to move the latter along the movement direction from a first position, away from the supporting element and to the tyre, and a second position, proximal to the supporting element and to the tyre, wherein the first and second positions are spaced apart along the movement direction parallel to the axis of rotation;
   control means for automatically positioning the bead breaker tool, the control means being connected to the actuator,
wherein the control means comprises a processor which is set up to receive input data representing a curve of the speed of the bead breaker tool during its movement towards the supporting element along the movement direction from the first position to the second position and which is programmed to process that data in order to identify a position of contact of the bead breaker tool with the tyre as a function of a deceleration of the bead breaker tool, wherein the processor is programmed to automatically disable the actuator, in response to the identification of a contact position of the bead breaker tool with respect to the tyre, to arrange the bead breaker tool in the contact position wherein the bead breaker tool is positioned on a flank of the tyre, but radially offset from the bead and from the rim, as a function of said input data representing a curve of the speed of the bead breaker tool during its movement towards the supporting element along the movement direction and as a function of a threshold value contained in a memory of the apparatus, wherein the contact position is identified in response to a drop of the speed of the bead breaker tool below said threshold value, wherein the processor is programmed to monitor the speed curve of the bead breaker tool until said speed drop occurs.

2. The apparatus according to claim 1, wherein the actuator is configured to move the bead breaker tool by applying to it a force which is constant or which follows a predetermined curve, the processor being programmed to identify that position as a function of a decrease of bead breaker tool speed which is not attributable either to the force applied to the bead breaker tool or to the weight force.

3. The apparatus according to claim 1, wherein the control means comprise a sensor designed to detect data representing a sequence of speed values of the bead breaker tool in a time series.

4. The apparatus according to claim 3, wherein the sensor comprises a position transducer connected to the bead breaker tool to detect the latter's position instantaneously.

5. The apparatus according to claim 4, wherein the sensor comprises an accelerometer connected to the bead breaker tool to detect the bead breaker tool's acceleration instantaneously.

6. The apparatus according to claim 1, wherein the processor is programmed to measure the values representing the tool position at predetermined time intervals, so that the corresponding detected speed values can be compared.

7. The apparatus according to claim 1, wherein the processor is programmed to derive the position of the bead breaker tool when the speed of the tool itself decreases to a predetermined threshold value, the processor being also programmed to be activated when the speed of the tool exceeds a predetermined activation value, above that predetermined threshold value.

8. The apparatus according to claim 7, wherein the threshold and activation values correspond to predetermined fractions of a peak value of bead breaker tool speed.

9. The apparatus according to claim 1, wherein the processor is programmed to identify the position of the bead breaker tool when the bead breaker tool reaches a predetermined deceleration value.

10. The apparatus according to claim 1, wherein the processor is connected to the actuator to activate it as a function of the derived position, so as to position the bead breaker tool at a working position after the positioning step.

11. The apparatus according to claim 1, wherein the control means comprise a memory associated with the processor and configured to store the data representing the derived position of the bead breaker tool in order to position the tool at the same contact position for all the wheels of a single vehicle.

12. The apparatus according to claim 1, wherein the actuator is configured to move the tool without decelerations, according to a constant or increasing law of motion, or wherein the processor is connected to the actuator so that the actuator is configured to move the tool according to a known law of motion.

13. A tyre changing method for removing a tyre from a respective rim, comprising the following steps:
   positioning the wheel on a supporting element in such a way that it rotates about its axis of rotation;
   moving a bead breaker tool towards the wheel along a movement direction, parallel to the axis of rotation, from a first position, away from the supporting element and to the tyre, and a second position, proximal to the supporting element and to the tyre, until it intercepts the wheel, wherein the first and second positions are spaced apart along the movement direction parallel to the axis of rotation;
   detecting input data representing a curve of bead breaker tool feed speed towards the wheel from the first position to the second position;
   identifying a position of contact of the bead breaker tool with the tyre as a function of the speed curve of the bead breaker tool and as a function of a memorized threshold value, wherein the contact position is identified in response to a drop of the speed of the bead breaker tool below said threshold value, by monitoring the speed curve of the bead breaker tool until said speed drop occurs;

arresting automatically, in response to the identifying step, the bead breaker tool in the contact position wherein the bead breaker tool is positioned on a flank of the tyre and radially offset from the bead and from the rim, as a function of said input data representing a curve of the speed of the bead breaker tool during its movement towards the supporting element along the movement direction.

14. The method according to claim 13, wherein the deriving step is performed when the feed speed of the bead breaker tool decreases to a predetermined value.

15. The method according to claim 13, comprising a step of automatically positioning the bead breaker tool at a predetermined position relative to the derived position.

16. The method according to claim 13, comprising a preliminary step calibrating the control means, the calibrating step comprising the following steps:

moving the tool along the movement direction;

detecting data representing a curve of bead breaker tool feed speed along the movement direction;

deriving at least one predetermined reference value of a control parameter correlated with the speed curve;

setting the predetermine reference value so as to allow the control means to identify the contact position as a function of that predetermined reference value.

17. The method according to claim 13, wherein the actuator moves the tool without decelerations, according to a constant or increasing law of motion, or according to a known law of motion.

* * * * *